United States Patent [19]
Caporusso et al.

[11] Patent Number: 5,594,306
[45] Date of Patent: Jan. 14, 1997

[54] ELECTRIC MOTOR FOR PORTABLE MACHINE TOOLS

[75] Inventors: Alessandro Caporusso; Mario Caporusso, both of Piedimonte S. Germano; Rossano Ramandi; Stefano Ramandi, both of Frosinone, all of Italy

[73] Assignee: C.M.L. Costruzioni Meccaniche Liri S.r.l., Frosinone, Italy

[21] Appl. No.: 397,871

[22] Filed: Mar. 2, 1995

[30] Foreign Application Priority Data

Mar. 10, 1994 [IT] Italy ................. RM94A0127

[51] Int. Cl.$^6$ ................................. H02P 5/418
[52] U.S. Cl. .................. 318/245; 318/259; 388/937
[58] Field of Search ................... 318/244, 245, 318/246, 256–263, 268–271, 276; 388/937

[56] References Cited

U.S. PATENT DOCUMENTS

| | | | |
|---|---|---|---|
| 4,412,158 | 10/1983 | Jefferson et al. | 318/257 |
| 4,454,459 | 6/1984 | Huber | 318/484 X |
| 4,503,370 | 3/1985 | Cuneo . | |
| 4,513,381 | 4/1985 | Houser, Jr. et al. | 364/475 |
| 4,737,661 | 4/1988 | Lessig, III et al. | 307/140 |

FOREIGN PATENT DOCUMENTS

| | | |
|---|---|---|
| 0033161 | 8/1981 | European Pat. Off. . |
| 0034822 | 9/1981 | European Pat. Off. . |

*Primary Examiner*—Bentsu Ro
*Attorney, Agent, or Firm*—Young & Thompson

[57] ABSTRACT

An electric motor for portable machine tools, comprising an output shaft for operating, means for sensing the speed of said output shaft; means for sensing the magnitude and the phase of the input voltage of the electric motor itself; means for sensing the electric current absorbed by the load, microprocessor means programmed for processing the detected values sensed by said means for sensing; means for generating an acceleration ramp at the starting; means for generating a deceleration ramp at the stopping, as well as means for generating the cruise speed of the tool, voltage controlled by said microprocessor in response to said detected values processed by itself, and means for controlling the forward running, reverse running and the run storing.

3 Claims, 9 Drawing Sheets

ELECTRIC MOTOR FOR PORTABLE MACHINE TOOLS

TECHNICAL FIELD

The present invention relates to the field of machine tools, such as for instance pipe benders, drills, grinders, threaders or tappers or die chasers, croppers, wrenchs or dynamometrical screwers and so on.

More specifically, the present invention relates to an electric motor for the operation thereof.

Moreover, the present invention relates to the machine tools endowed with such an electric motor for their own operation.

BACKGROUND OF THE INVENTION

The portable machine tools of the present day endowed with such an electric motor for their operation are to be used by an operator driving the primary motion of the tool through the electric motor in a suitable way, as a function of the situation in which the tool itself turns out to find itself time by time.

The driving of the machine tool is therefore carried out by the operator, based upon how he "feels" the situation of the tool time by time.

For instance, the electric motors of drills are endowed with a control circuit scheme including triacs, diacs, passive components and so on, with a variable resistive component which is inserted through a button to be pressed to modulate the speed of revolution of the tip of the drill.

The portable machine tools of the present day are thus endowed with simple means for intervening on the primary motion of the machine tool, but the drive remains deputed to the sensitivity, the processing and the intervention of the operator.

However, the proceeding on the feeling of the operator in the drive of the primary motion of the tool of the machine renders the machining exacting and the results of the same potentially not much precise.

OBJECTS AND CHARACTERISTICS OF THE INVENTION

The object of the present invention is to provide an electric motor portable machine tool wherein the primary motion of the tool is driven automatically by the electric motor itself as a function of the situation in which the tool turns out to find itself time by time, that is to say endowed with a feedback feature.

Such an object is achieved by equipping the machine tool, or better the relevant operation electric motor, with a control electronic apparatus built up around a single-chip microprocessor programmed to process input data representative of the working solution, that is to say of the stress, of the tool, such as for instance the electric current taken up under stress, so as to provide output data for the intervention on the primary motion of the tool itself. The quantity which one intervenes upon for the drive of the primary motion of the tool is the electric voltage.

The control apparatus comprises sensors which provide said input data to the microprocessor, as well as operation means for realizing the intervention on the primary motion decided by the microprocessor. The components that complete the control apparatus in addition to the programmed single-chip microprocessor are all of low power and arranged in low energy consumption circuit configuration. The control apparatus assembled on the machine tool doesn't compromise its portability, as with the above constructive contrivances it can be made in a sufficiently little encumbrance.

SUBJECT OF THE INVENTION

Therefore, the present invention relates to a portable electric motor for machine tools, comprising an operation output shaft, characterized in that it comprises means for sensing the speed of said output shaft;

means for sensing the magnitude and the phase of the input voltage of the electric motor itself;

means for sensing the electric current taken up by the load;

microprocessor means programmed for processing the detected values sensed by said sensing means;

means for generating an acceleration ramp at the beginning;

means for generating a deceleration ramp at the stopping, as well as means for generating the cruise speed of the tool, voltage controlled by said microprocessor in response to said detected values processed by itself, and means for controlling the forward running, the reverse running and for storing the running.

The present invention also relates to such an electric motor, further equipped with means for displaying the status of the electric motor.

Preferred embodiments are set forth in the sub-claims.

ADVANTAGES OF THE INVENTION

The present invention affords various important advantages. They are of economical nature, as it allows low manufacturing costs and a low energy consumption in its operation, as well as of miniaturization, which allows a portable machine tool to be obtained endowed with a capability of feedback to the working situation in which the tool turns out to find itself time by time.

The microprocessor means can be programmed to provide the most suitable voltage controls for each type of tool in reference to the various types of materials which the tool will have to work upon. The capability of feedback is thus programmeable for each particular case.

The microprocessor can be interchangeable, providing a microprocessor for each single working situation.

BRIEF DESCRIPTION OF THE DRAWINGS

The present invention will be best understood based upon the following detailed disclosure of its preferred embodiment, given only as a matter of example, absolutely not of restriction, in reference to the annexed drawings, wherein.

DESCRIPTION OF THE PREFERRED EMBODIMENT

Figure 1:
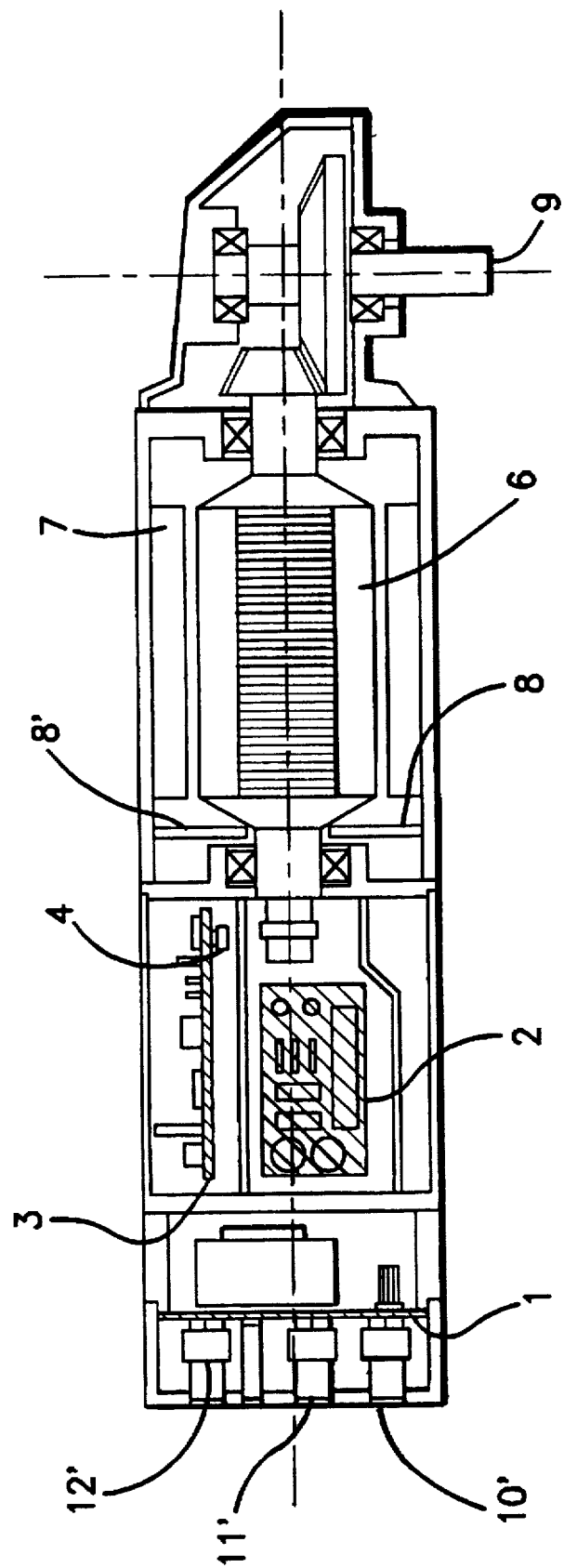
FIG. 1 represents in longitudinal section an electric motor according to the teaching of the present invention, fit for operating a pipe bending machine.
Figure 2:
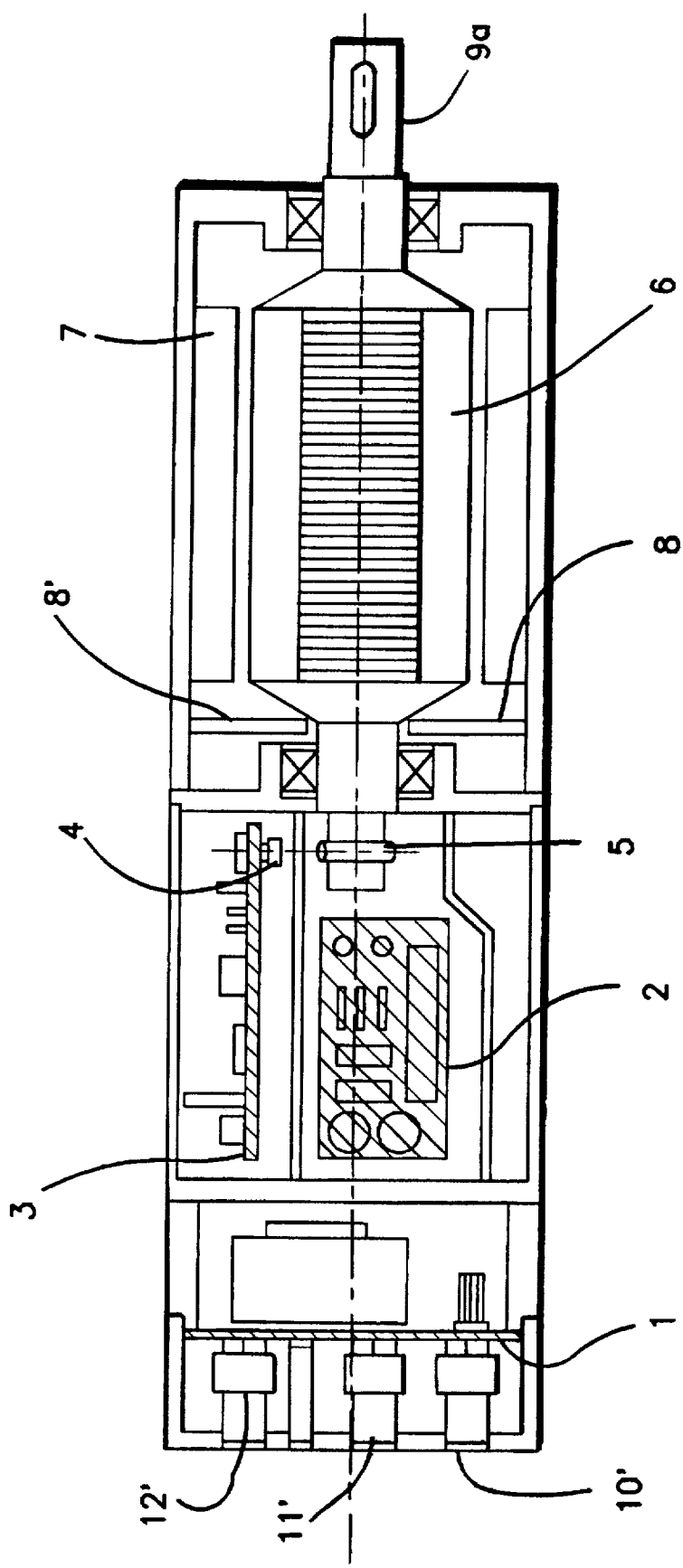
FIG. 2 represents in longitudinal section an electric motor according to the teaching of the present invention, fit for operating a drill or a threader.
Figure 3A:
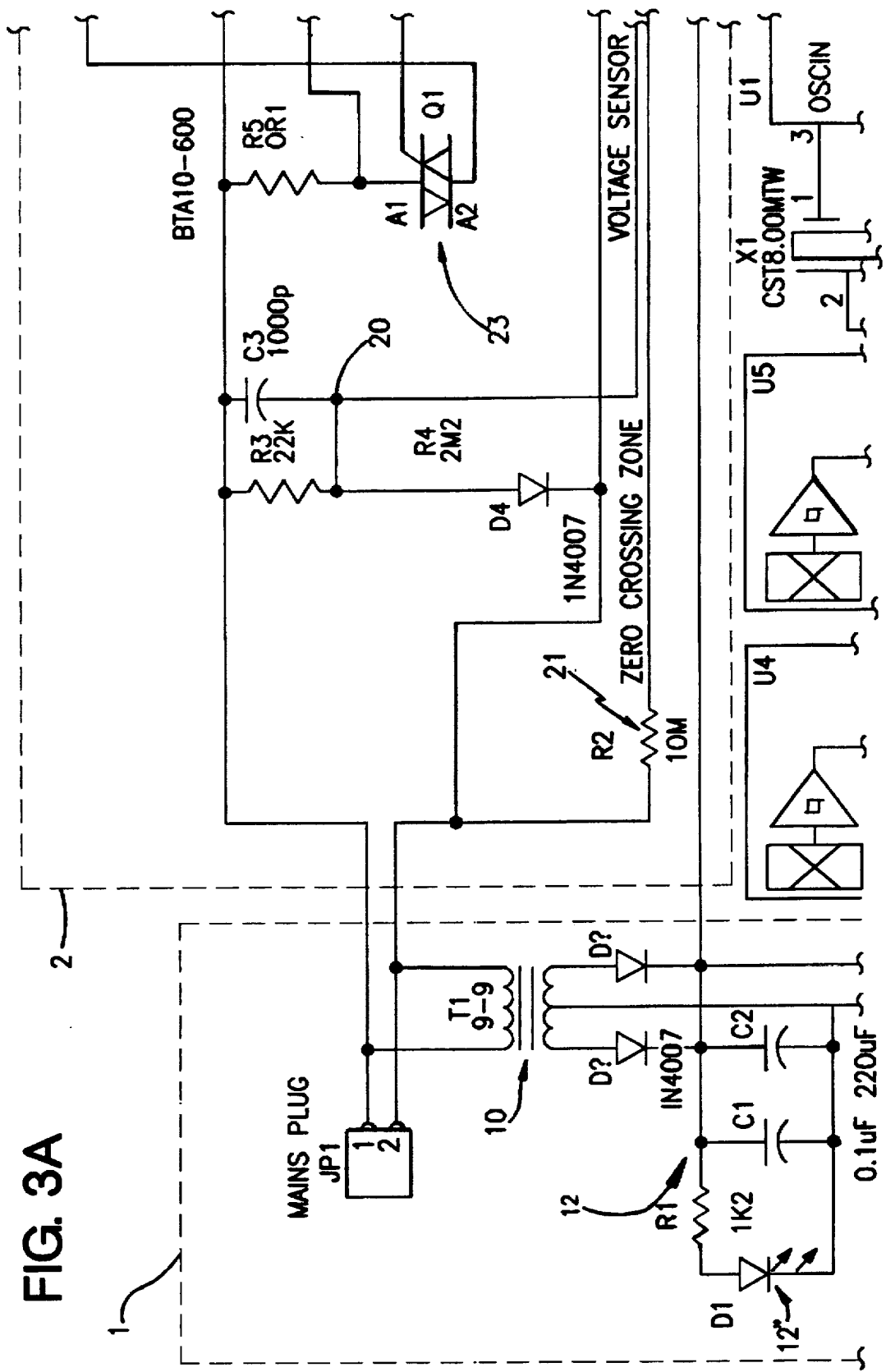
FIG. 3 represents the electric scheme of the electronics making up the apparatus for controlling the electric motors of FIGS. 1 and 2.
Figure 3B:
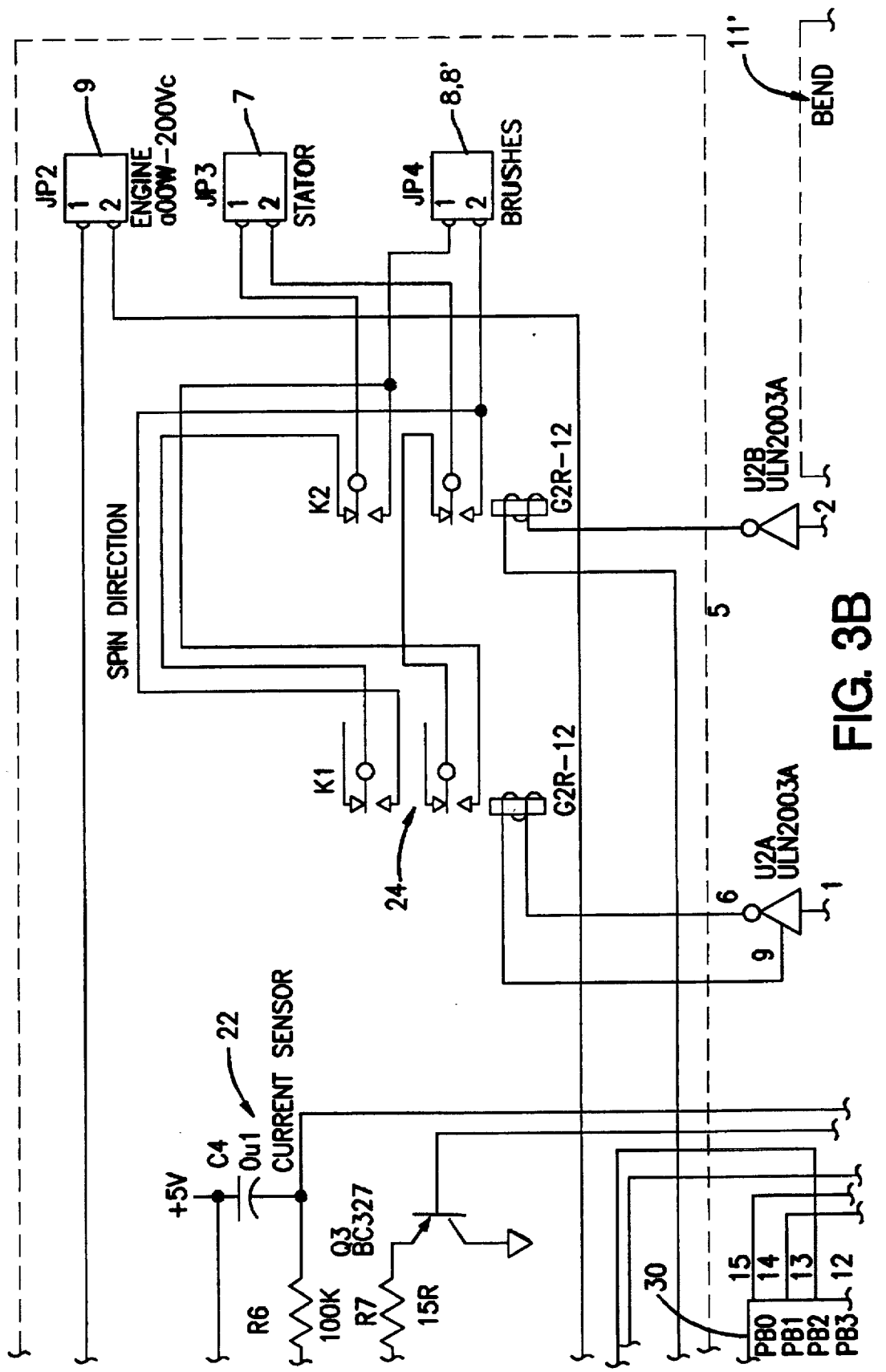
Figure 3C:
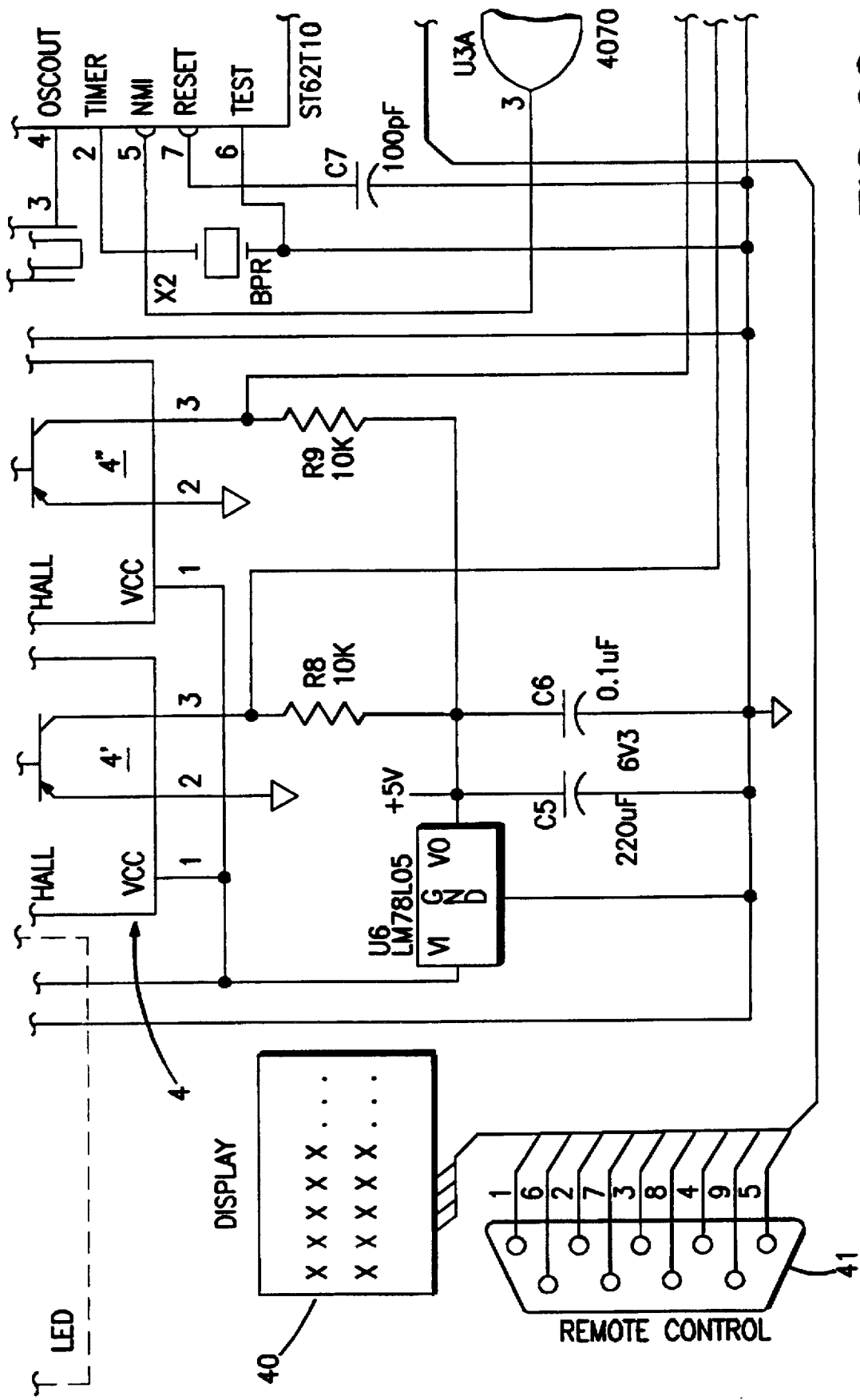
Figure 3D:
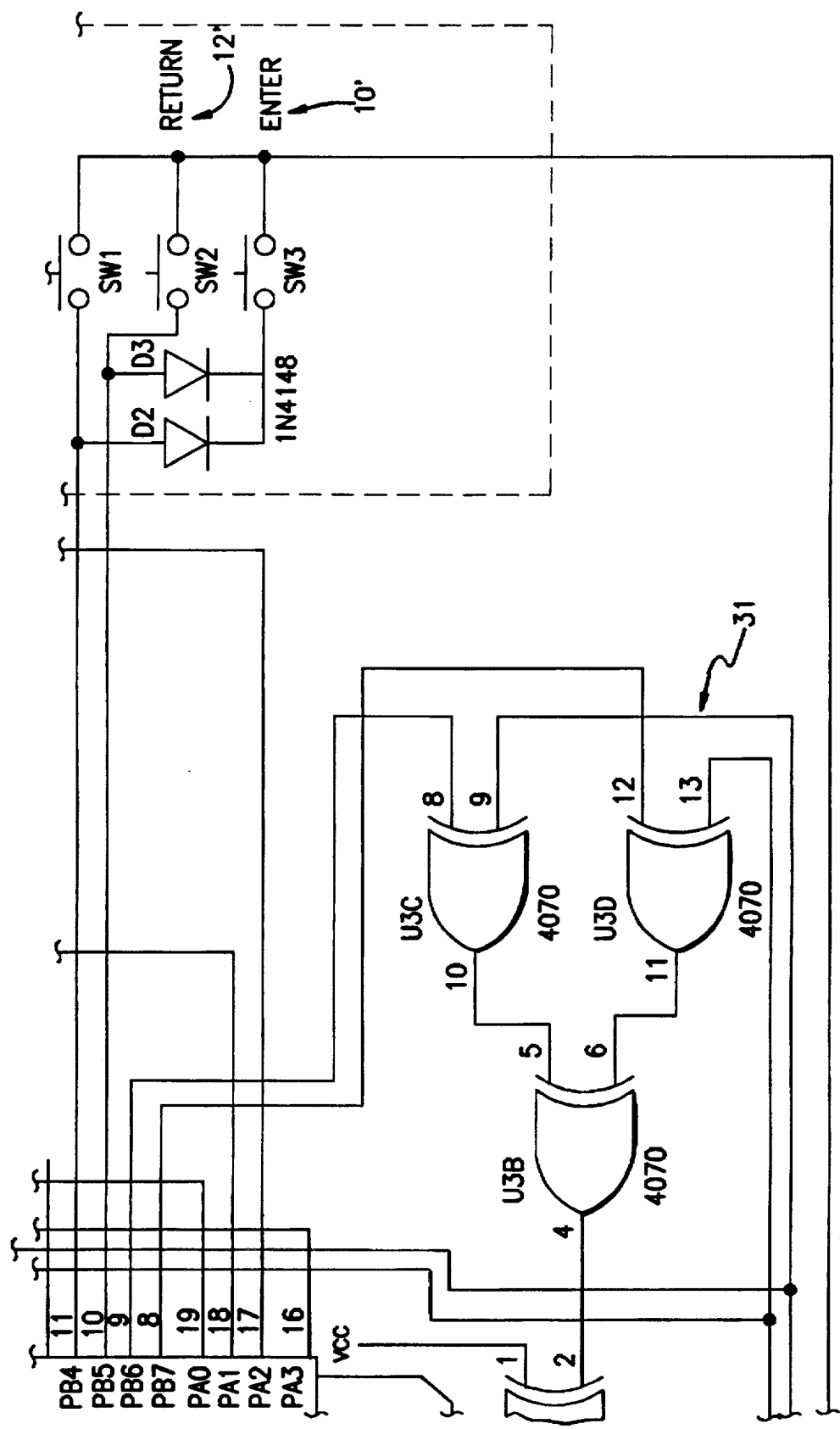

With reference to FIGS. 1 and 2, two portable machine tools can be observed, equipped with an electric motor according to the teaching of the present invention. They include an electric motor made up of a rotor 6 and a stator 7, and of brushes 8, 8'. Such a motor intervenes on an output shaft 9, 9a through a transmission.

The feature of the invention consists in the electronics for controlling such an electric motor. It is represented by circuit boards or panels 1, 2 and 3 that receive input data from a sensor or detector 4.

The machines are completed by means for inputting operator controls, made up of keys 10, 11, 12, disclosed hereinbelow.

The control electronics is illustrated in the details in FIG. 3.

It comprises three circuit boards or panels 1, 2, 3, and is built up around a microprocessor 30 on the board 3.

The electronics comprises a sensor 4 made up of two Hall effect sensors 4', 4" to sense the speed of the output shaft 9, i.e. of the number of revolutions per minute thereof.

The single-chip microprocessor, or microchip 30 is connected with the sensor 4 to receive in input data representative of the logic configuration of the two Hall effect sensors 4', 4".

The microprocessor 30 is a model SGS-ST62T10 in the present execution of the present invention. However, it could also be any other model available commercially, with suitable adaptations of the control circuit that incorporates it, such as for instance a Motorola Model 68K05 or a model of Zilog's Z86 family, without so departing from the scope of the present invention.

The microprocessor 30 repeats said logic configuration of the two Hall effect sensors 4', 4" at the input of a camparator circuit 31, which processes the input in such a way as to give as a result at pin NMI (Not Maskable Interrupt) of microprocessor 30 itself a high state o logic level represented by 1, working in positive logic.

When the configuration of sensors 4', 4" changes (that is to say the state of one and only one of the sensors themselves changes) one has a state change in correspondence with the aforementioned pin NMI, which change generates a not maskable interrupt. In the routine for executing such an interrupt the new position is processed, with an increase or a decrease of the number of revolutions per minute of the output shaft, and the new configuration at the input of the integrated comparator circuit 31 is updated, in order to be able to sense a new change of state of the sensors 4', 4".

The control electronics also includes means for sensing the input voltage, to provide the relevant datum to the aforementioned microprocessor 30, which input voltage presents itself to a node 20 in the form of a half wave. The peak voltage is sensed taking the main frequency into account.

The (analogue) detected values are converted into digital form in an eight(8)-bit format and stored. The detected values allow the couple and the power taken up by the motor to be calculated.

A zero crossing sensor is also provided to provide the phase of the voltage.

Thereafter the control electronics comprises means for sensing the electric current taken up by the load under stress.

The sensing is carried out in correspondence with a node 22, in the point of maximum absorption (whereat the current presents itself in a substantially sinusoidal form).

Moreover, the control electronics comprises means for driving the output shaft, these are made up of a turning-on triac 23. Based upon the output of the phase sensor 21 the triac turns on with pulses in a delay of 40 microseconds programmed with respect to the zero crossing to achieve the desired speed of revolution of the output shaft. The greater the delay, the lesser the speed. That is to say, the speed, measured for instance as the number of revolutions performed in a minute, is inversely proportional to the delay of the impulse on the triac with respect to the zero crossing sensed by the sensor 21. The microprocessor 30 intervenes upon the motor through the triac 23 (generation of a programmed rms voltage that can be pre-set as a default or set by the operator) as a function of the sensed values, so obtaining the desired speed.

The drive assembly of the electric motor thus comprises the triac 23 and the microprocessor 30 itself.

It inserts the stator and brush power based upon operator controls through two relays 24, 25 so configured, that only one can be active. The power of the brushes drives the running sense of the motor based upon its own being positive or negative relative to the stator.

The operator controls are imparted through forward running 11', reverse running 12' and run setting 10' buttons.

The control electronics is powered by a power assembly 1. It comprises a transformer 10, means for rectifying current 11 and means for regulating voltage made up of a voltage controller 12. The power assembly supplies a not regulated voltage of 12 V c.c. for the supply of the two aforementioned relays and a regulated voltage of 5 V for the circuits for handling information.

Also a viewer 40, which presents information about the state of the electric motor, is connected with the microprocessor 30. The connection means of such a viewer with the microprocessor, made up of a connection bus, offer a plug board 41 for the connection of other eventual apparata of interest.

Besides the viewer, a device can be provided for acoustically signalling state information, expressed for instance in a Morse type code, in order that the operator doesn't have to divert his look from the operation in progress.

Figure 4:
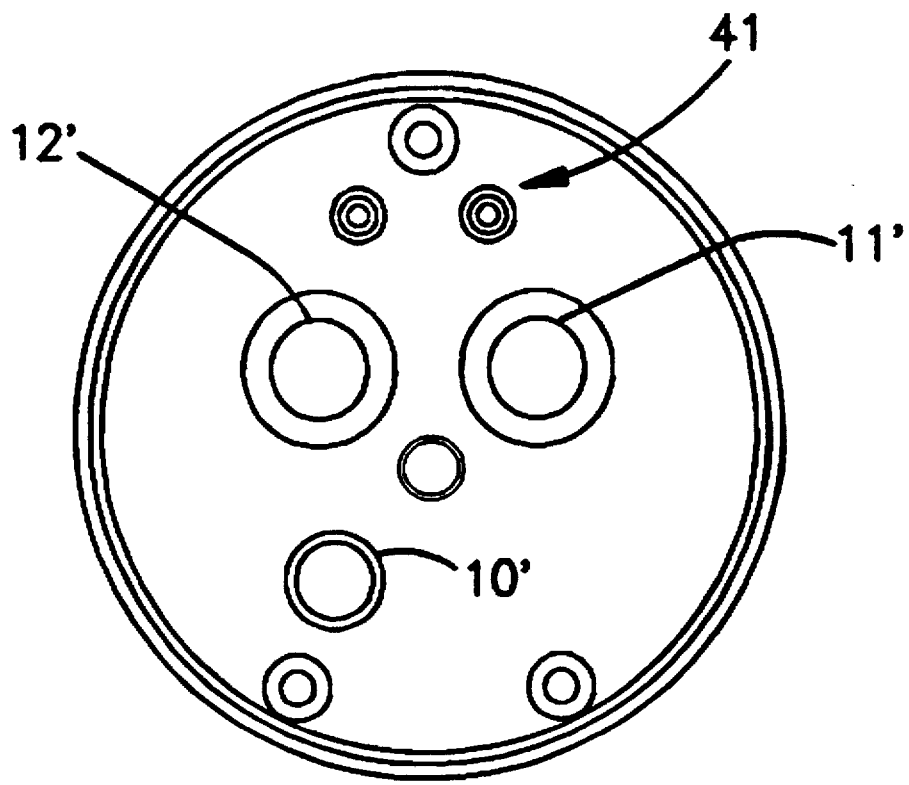
FIG. 4 represents an operator interface with the control electronics of FIG. 3.

FIG. 4 illustrates the operator interface with the control electronics. It comprises a red light emitting diode 12", also illustrated in FIG. 3, indicating the power-on state of the machine in its lighted state, and three keys, respectively for controlling the forward running 11', the reverse running 12' and the run storing 10', as well as said plug board 41, illustrated herein with two sockets.

Figure 5:
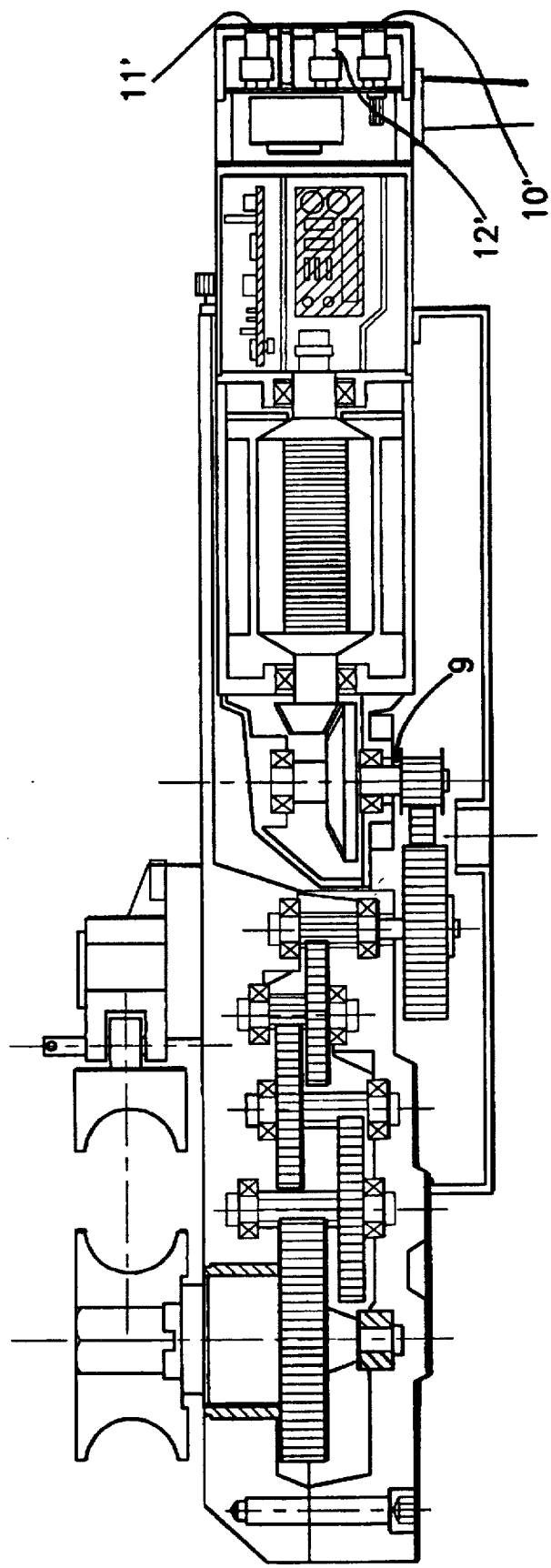
FIG. 5 represents in longitudinal section a pipe bending machine equipped with the electronic control electric motor of FIG. 1.
Figure 6:
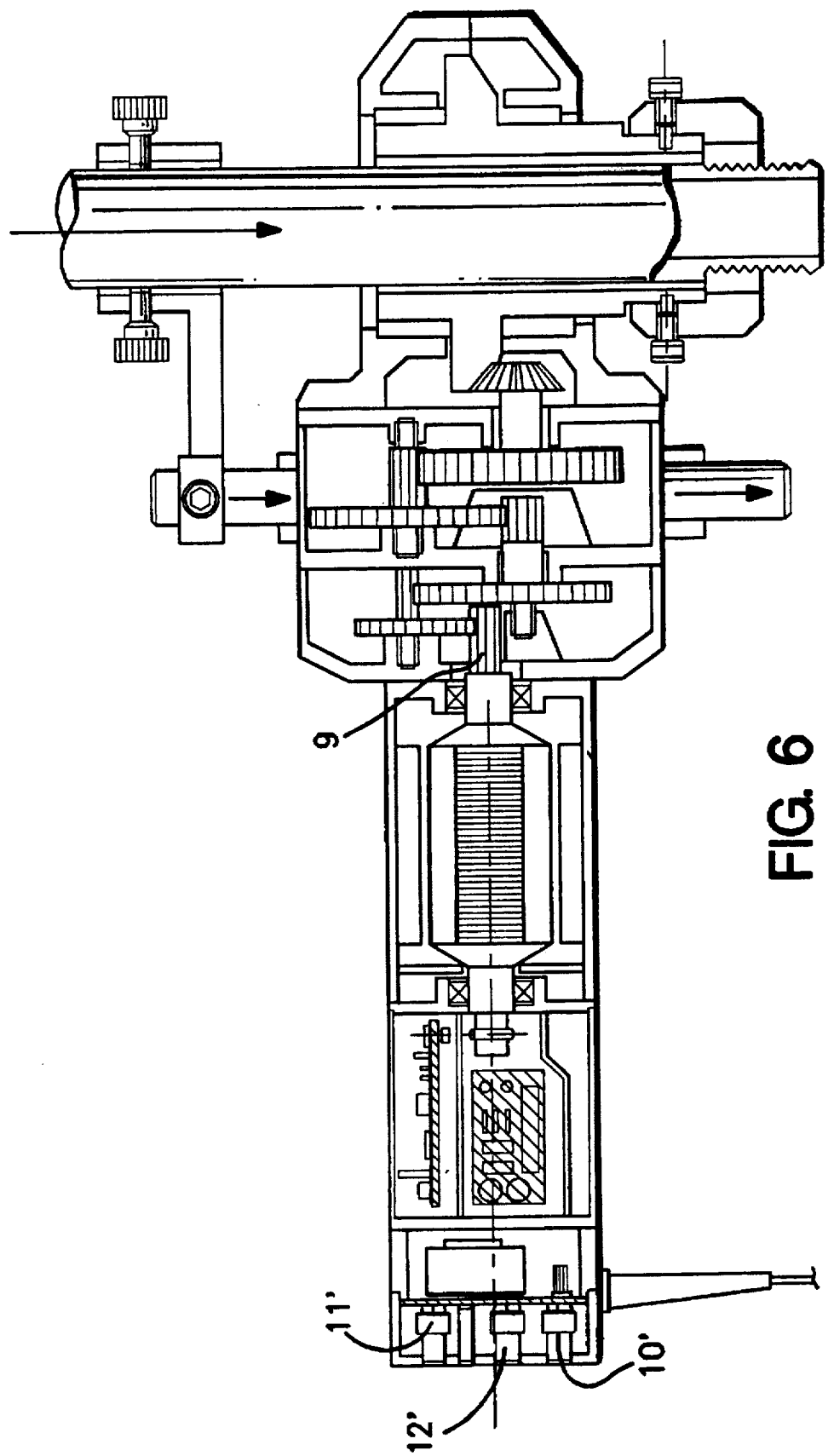
FIG. 6 represents in longitudinal section a threader equipped with the electronic control electric motor of FIG. 2.

FIGS. 5 and 6 respectively illustrate a pipe bending machine and a threading die or tapping machine or threader equipped with the electric motor according to the present invention.

The pipe bending machine and the threading die are operated by the output shaft 9 through a transmission.

The present invention has been disclosed and illustrated with reference to a specific embodiment thereof, but it is to be expressedly understood that variations, additions and/or omissions can be made, without so departing from the scope of protection relevant thereto, according to how set forth by the annexed claims.

We claim:

1. In a reversible electric motor for portable machine tools, comprising an output shaft for operating; means for sensing the magnitude and the phase of the input voltage of the electric motor itself; means for sensing the electric current absorbed by the load, the improvement comprising:

a plurality of Hall sensors making up an encoder for sensing the speed of said output shaft;

and programmable microprocessor means for processing the information provided by said encoder so as to be able to create a working cycle and so to operate automatically.

2. The electric motor for portable machine tools according to claim 1, further comprising means for displaying the state of the motor to the operator.

3. The electric motor according to claim 2, wherein said means for displaying are made up of an alphanumeric viewer.

* * * * *